United States Patent
Akkarakaran et al.

(10) Patent No.: US 11,350,463 B2
(45) Date of Patent: May 31, 2022

(54) RANDOM ACCESS CHANNEL (RACH) PROCEDURE POWER CONTROL

(71) Applicant: QUALCOMM Incorporated, San Diego, CA (US)

(72) Inventors: Sony Akkarakaran, Poway, CA (US); Xiaoxia Zhang, San Diego, CA (US); Jing Sun, San Diego, CA (US); Tao Luo, San Diego, CA (US); Muhammad Nazmul Islam, Littleton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 16/775,056

(22) Filed: Jan. 28, 2020

(65) Prior Publication Data

US 2020/0252974 A1 Aug. 6, 2020

Related U.S. Application Data

(60) Provisional application No. 62/799,680, filed on Jan. 31, 2019.

(51) Int. Cl.
*H04W 74/08* (2009.01)
*H04W 52/36* (2009.01)
(Continued)

(52) U.S. Cl.
CPC ....... *H04W 74/0833* (2013.01); *H04W 52/36* (2013.01); *H04W 72/0473* (2013.01); *H04W 76/27* (2018.02)

(58) Field of Classification Search
CPC ............. H04W 74/0833; H04W 52/36; H04W 52/146; H04W 52/50; H04W 52/242;
(Continued)

(56) References Cited

U.S. PATENT DOCUMENTS

2016/0338112 A1* 11/2016 Lee ..................... H04W 72/042
2017/0013610 A1* 1/2017 Lee ....................... H04L 1/1861
(Continued)

FOREIGN PATENT DOCUMENTS

EP 3585112 A1 12/2019
WO 2018151230 A1 8/2018

OTHER PUBLICATIONS

International Search Report and Written Opinion—PCT/US2020/015610—ISA/EPO—dated May 6, 2020.

*Primary Examiner* — Ricardo H Castaneyra
(74) *Attorney, Agent, or Firm* — Patterson + Sheridan LLP

(57) ABSTRACT

Certain aspects of the disclosure provide techniques for random access channel (RACH) power control, including for message (MSGA) transmission by a user equipment (UE) for two-step RACH procedure. Certain aspects provide a method for wireless communication generally including determining a transmit power for transmitting a first message to a base station (BS) as part of a two-step RACH procedure, the first message comprising a first part and a second part. Determining the transmit power comprises determining a first transmit power for transmitting the first part based on a first function having parameters including a power ramping counter and a power ramping step. Determining the transmit power further comprises determining a second transmit power for transmitting the second part based on a second function having parameters including the power ramping counter and the power ramping step. The method further includes incrementing the power ramping counter based on transmitting the first message.

27 Claims, 10 Drawing Sheets

(51) Int. Cl.
*H04W 72/04* (2009.01)
*H04W 76/27* (2018.01)

(58) Field of Classification Search
CPC .. H04W 72/0473; H04W 76/27; H04W 24/02
See application file for complete search history.

(56) References Cited

U.S. PATENT DOCUMENTS

| | | | |
|---|---|---|---|
| 2018/0279376 A1* | 9/2018 | Dinan | H04W 74/0833 |
| 2018/0317264 A1 | 11/2018 | Agiwal et al. | |
| 2020/0045650 A1* | 2/2020 | Suzuki | H04W 76/11 |
| 2020/0100299 A1* | 3/2020 | Loehr | H04W 72/0446 |
| 2020/0221503 A1* | 7/2020 | Kusashima | H04W 74/0833 |
| 2020/0404711 A1* | 12/2020 | Zhao | H04W 52/36 |

* cited by examiner

RANDOM ACCESS CHANNEL (RACH) PROCEDURE POWER CONTROL

CROSS-REFERENCE TO RELATED APPLICATION(S)

This application claims benefit of and priority to U.S. Provisional Application No. 62/799,680, filed Jan. 31, 2019, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and to techniques for random access channel (RACH) power control.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication. The method generally includes determining a transmit power for transmitting a first message to a base station (BS) as part of a two-step random access channel (RACH) procedure, the first message comprising a first part comprising a RACH preamble and a second part comprising a radio resource control (RRC) connection request. Determining the transmit power comprises determining a first transmit power for transmitting the first part based on a first function having parameters including a power ramping counter and a power ramping step. Determining the transmit power further comprises determining a second transmit power for transmitting the second part based on a second function having parameters including the power ramping counter and the power ramping step. The method further includes transmitting the first message to the BS using the determined transmit power. The method further includes incrementing the power ramping counter based on transmitting the first message.

Certain aspects provide a user equipment including a memory and a processor coupled to the memory. The processor is configured to determine a transmit power for transmitting a first message to a base station (BS) as part of a two-step random access channel (RACH) procedure, the first message comprising a first part comprising a RACH preamble and a second part comprising a radio resource control (RRC) connection request. Determining the transmit power comprises determining a first transmit power for transmitting the first part based on a first function having parameters including a power ramping counter and a power ramping step. Determining the transmit power further comprises determining a second transmit power for transmitting the second part based on a second function having parameters including the power ramping counter and the power ramping step. The processor is configured to transmit the first message to the BS using the determined transmit power. The processor is configured to increment the power ramping counter based on transmitting the first message.

Certain aspects provide a user equipment. The user equipment generally includes means for determining a transmit power for transmitting a first message to a base station (BS) as part of a two-step random access channel (RACH) procedure, the first message comprising a first part comprising a RACH preamble and a second part comprising a radio resource control (RRC) connection request. Determining the transmit power comprises determining a first transmit power for transmitting the first part based on a first function having parameters including a power ramping counter and a power ramping step. Determining the transmit power further comprises determining a second transmit power for transmitting the second part based on a second function having parameters including the power ramping counter and the power ramping step. The user equipment further includes means for transmitting the first message to the BS using the determined transmit power. The user equipment further includes means for incrementing the power ramping counter based on transmitting the first message.

Certain aspects provide a non-transitory computer-readable medium that comprises instructions that when executed by a user equipment (UE), cause the UE to perform a method for wireless communication. The method generally includes determining a transmit power for transmitting a first message to a base station (BS) as part of a two-step random access channel (RACH) procedure, the first message comprising a first part comprising a RACH preamble and a second part comprising a radio resource control (RRC) connection request. Determining the transmit power comprises determining a first transmit power for transmitting the first part based on a first function having parameters including a power ramping counter and a power ramping step. Determining the transmit power further comprises determining a second transmit power for transmitting the second part based on a second function having parameters including the power ramping counter and the power ramping step. The method further includes transmitting the first message to the BS using the determined transmit power. The method further includes incrementing the power ramping counter based on transmitting the first message.

Aspects of the present disclosure provide means for, apparatus, processors, and computer-readable mediums for performing the methods described herein, such as by a UE.

Aspects of the present disclosure provide means for, apparatus, processors, and computer-readable mediums for performing techniques and methods that may be complementary to the operations performed by a UE described herein, such as by a BS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
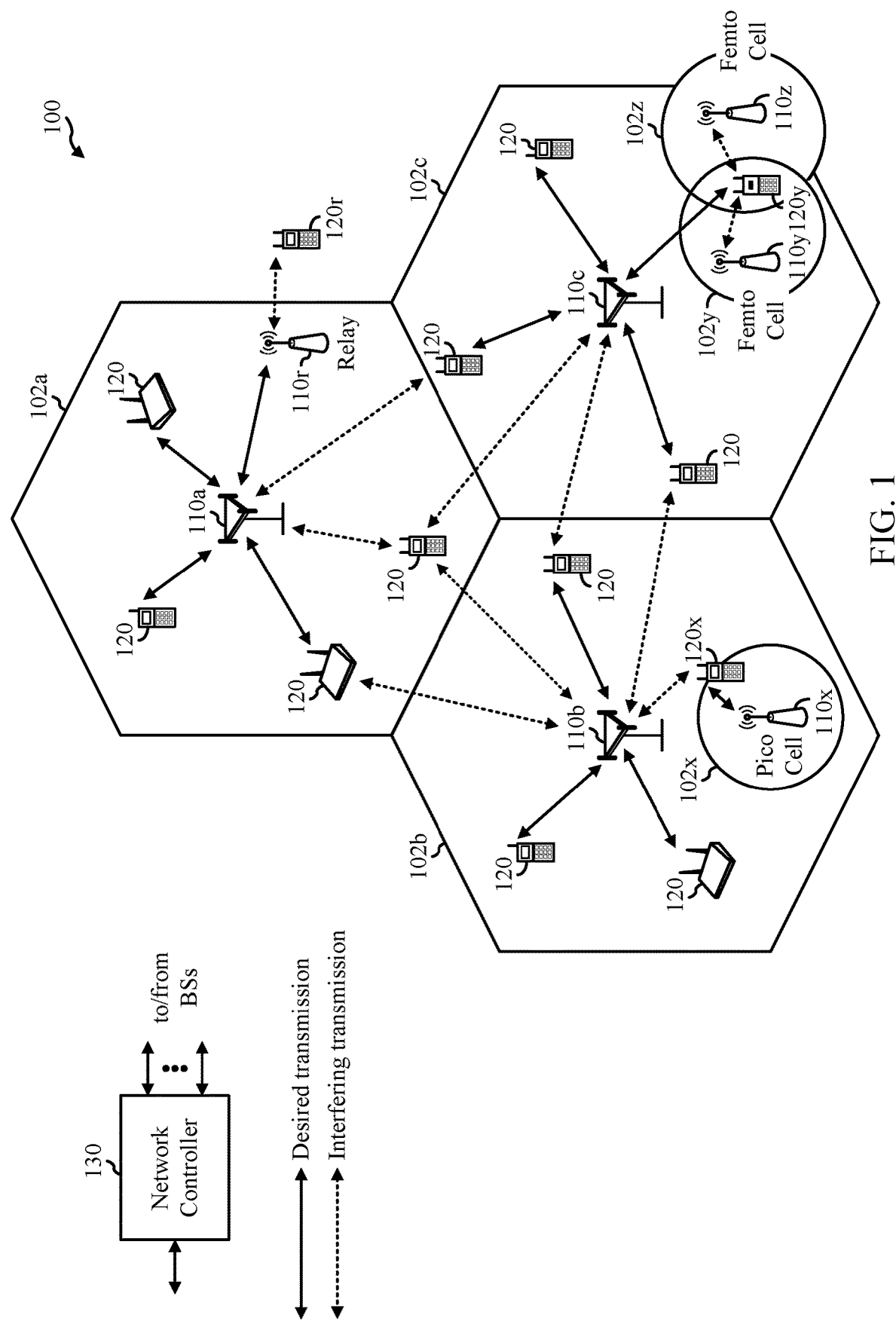
FIG. 1 is a block diagram conceptually illustrating an example telecommunications system, in accordance with certain aspects of the present disclosure.

Aspects of the present disclosure provide apparatus, methods, processing systems, and computer readable mediums for RACH power control. In certain aspects, techniques discussed herein relate to power control for transmission of Message A (MSGA) by a UE for a two-step RACH procedure. Further, certain aspects relate to power control for transmission of Message 1 (MSG1) by a UE for a four-step RACH procedure.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. In certain aspects, a UE 120 is configured to perform RACH power control according to various aspects discussed herein, such as for power control of transmission of MSGA (and optionally MSG1) by the UE 120. Further, in certain aspects, BS 110 is configured to configure the UE 120 with parameters (e.g., via radio resource control (RRC) signaling) for performing such RACH power control according to various aspects discussed herein.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20

Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
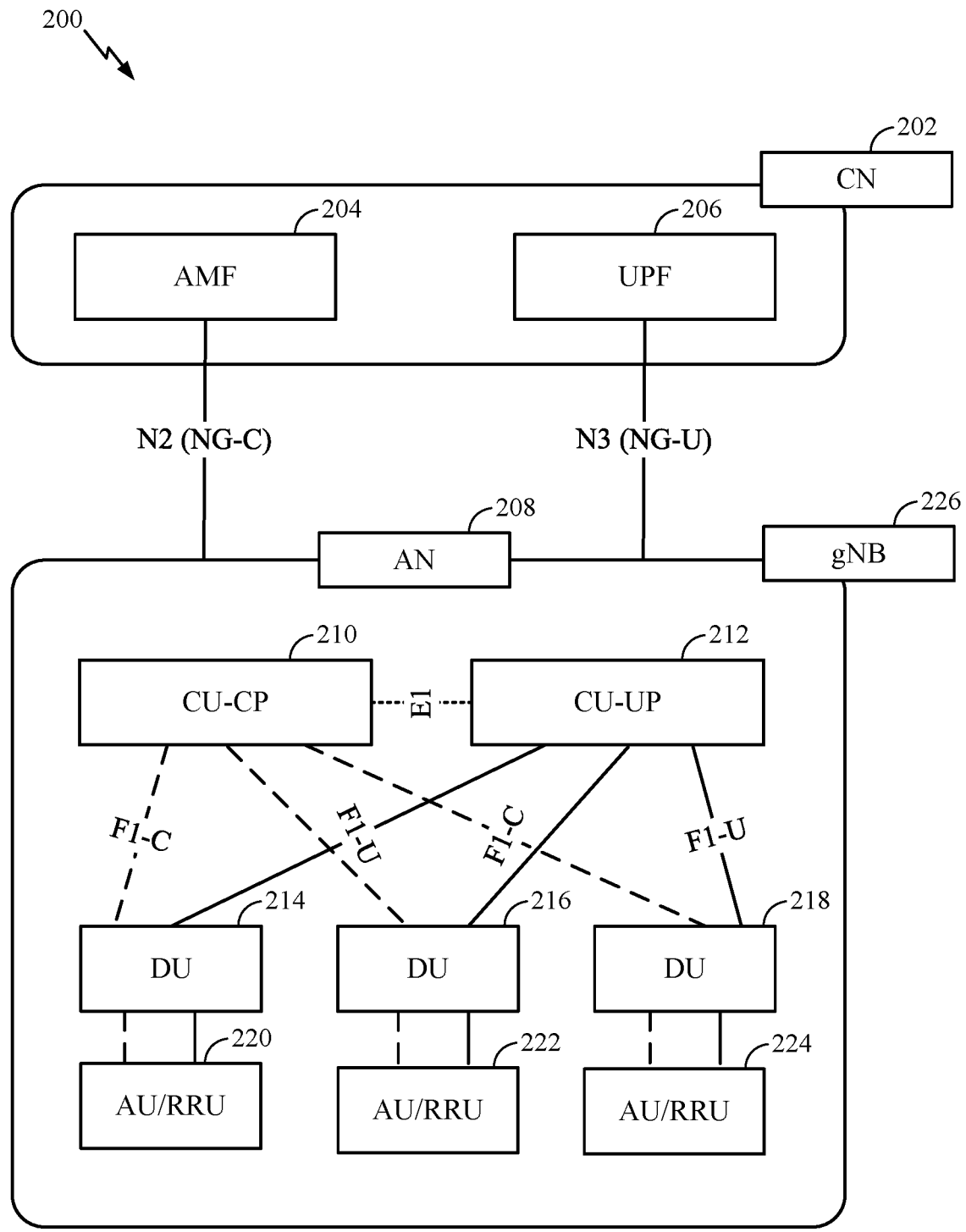
FIG. 2 is a block diagram illustrating an example architecture of a distributed radio access network (RAN), in accordance with certain aspects of the present disclosure.

FIG. 2 illustrates an example architecture of a distributed Radio Access Network (RAN) 200, which may be implemented in the wireless communication network 100 illustrated in FIG. 1. As shown in FIG. 2, the distributed RAN includes Core Network (CN) 202 and Access Node 208.

The CN 202 may host core network functions. CN 202 may be centrally deployed. CN 202 functionality may be offloaded (e.g., to advanced wireless services (AWS)), in an effort to handle peak capacity. The CN 202 may include the Access and Mobility Management Function (AMF) 204 and User Plane Function (UPF) 206. The AMF 204 and UPF 206 may perform one or more of the core network functions.

The AN 208 may communicate with the CN 202 (e.g., via a backhaul interface). The AN 208 may communicate with the AMF 204 via an N2 (e.g., NG-C) interface. The AN 208 may communicate with the UPF 208 via an N3 (e.g., NG-U) interface. The AN 208 may include a central unit-control plane (CU-CP) 210, one or more central unit-user plane (CU-UPs) 212, one or more distributed units (DUs) 214-218, and one or more Antenna/Remote Radio Units (AU/RRUs) 220-224. The CUs and DUs may also be referred to as gNB-CU and gNB-DU, respectively. One or more components of the AN 208 may be implemented in a gNB 226. The AN 208 may communicate with one or more neighboring gNBs.

The CU-CP 210 may be connected to one or more of the DUs 214-218. The CU-CP 210 and DUs 214-218 may be connected via a F1-C interface. As shown in FIG. 2, the CU-CP 210 may be connected to multiple DUs, but the DUs may be connected to only one CU-CP. Although FIG. 2 only illustrates one CU-UP 212, the AN 208 may include multiple CU-UPs. The CU-CP 210 selects the appropriate CU-UP(s) for requested services (e.g., for a UE).

The CU-UP(s) 212 may be connected to the CU-CP 210. For example, the DU-UP(s) 212 and the CU-CP 210 may be connected via an E1 interface. The CU-CP(s) 212 may connected to one or more of the DUs 214-218. The CU-UP(s) 212 and DUs 214-218 may be connected via a F1-U interface. As shown in FIG. 2, the CU-CP 210 may be connected to multiple CU-UPs, but the CU-UPs may be connected to only one CU-CP.

A DU, such as DUs 214, 216, and/or 218, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214-216 may be connected with one of AU/RRUs 220-224.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using Bearer Context Management functions. Data forwarding between CU-UP(s) 212 may be via a Xn-U interface.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, AN 208 may support dual connectivity with NR and may share a common fronthaul for LTE and NR. The distributed RAN 200 may enable cooperation between and among DUs 214-218, for example, via the CU-CP 212. An inter-DU interface may not be used.

Logical functions may be dynamically distributed in the distributed RAN 200. As will be described in more detail with reference to FIG. 3, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the AN and/or UE.

Figure 3:
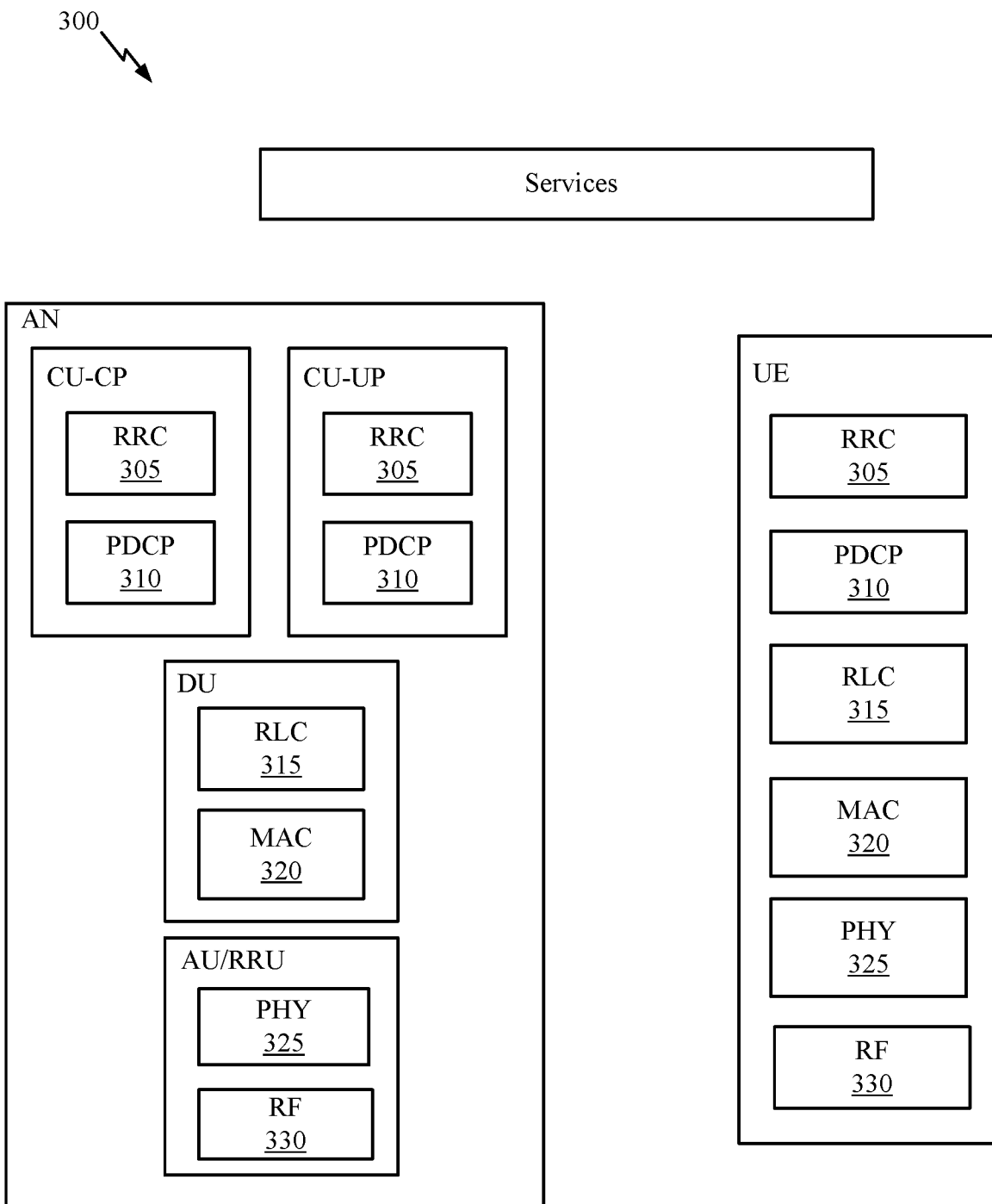
FIG. 3 is a block diagram showing examples for implementing a communication protocol stack in the example RAN architecture, in accordance with certain aspects of the present disclosure.

FIG. 3 illustrates a diagram showing examples for implementing a communications protocol stack 300 in a RAN (e.g., such as the RAN 200), according to aspects of the present disclosure. The illustrated communications protocol stack 300 may be implemented by devices operating in a wireless communication system, such as a 5G NR system (e.g., the wireless communication network 100). In various examples, the layers of the protocol stack 300 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 3, the system may support various services over one or more protocols. One or more protocol layers of the protocol stack 300 may be implemented by the AN and/or the UE.

As shown in FIG. 3, the protocol stack 300 is split in the AN (e.g., AN 208 in FIG. 2). The RRC layer 305, PDCP layer 310, RLC layer 315, MAC layer 320, PHY layer 325, and RF layer 530 may be implemented by the AN. For example, the CU-CP (e.g., CU-CP 210 in FIG. 2) and the CU-UP e.g., CU-UP 212 in FIG. 2) each may implement the RRC layer 305 and the PDCP layer 310. A DU (e.g., DUs 214-218 in FIG. 2) may implement the RLC layer 315 and MAC layer 320. The AU/RRU (e.g., AU/RRUs 220-224 in FIG. 2) may implement the PHY layer(s) 325 and the RF layer(s) 330. The PHY layers 325 may include a high PHY layer and a low PHY layer.

The UE may implement the entire protocol stack 300 (e.g., the RRC layer 305, the PDCP layer 310, the RLC layer 315, the MAC layer 320, the PHY layer(s) 325, and the RF layer(s) 330).

Figure 4:
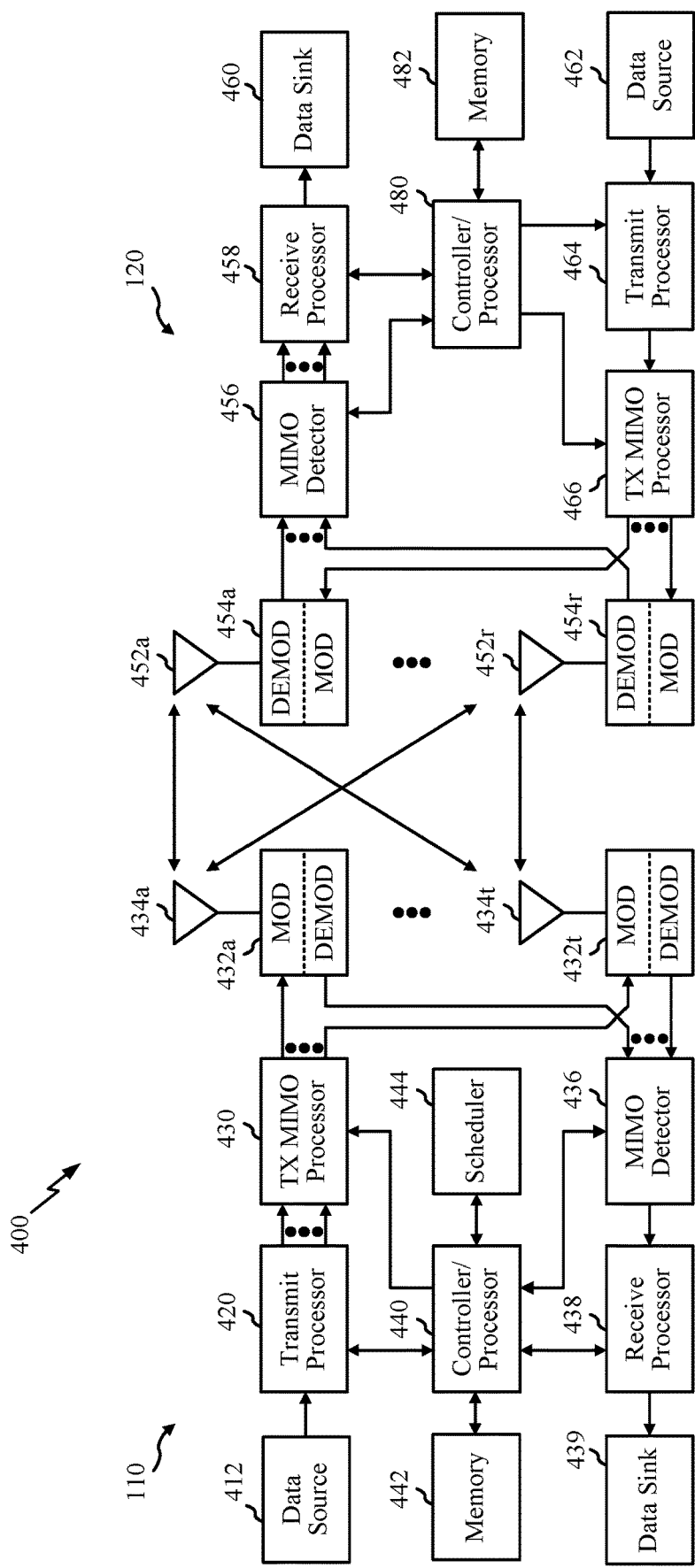
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein. For example, antennas 452, processors 466, 458, 464, and/or controller/processor 480 of the UE 120 may be configured to perform the operations described with respect to FIG. 9.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The processor 480 and/or other processors and modules at the UE 120 may perform or direct the execution of processes for the techniques described herein, such as those described with respect to FIG. 9. The memories 442 and 482 may store data and program codes for BS 110 and UE 120, respectively. A scheduler 444 may schedule UEs for data transmission on the downlink and/or uplink.

Figure 5:
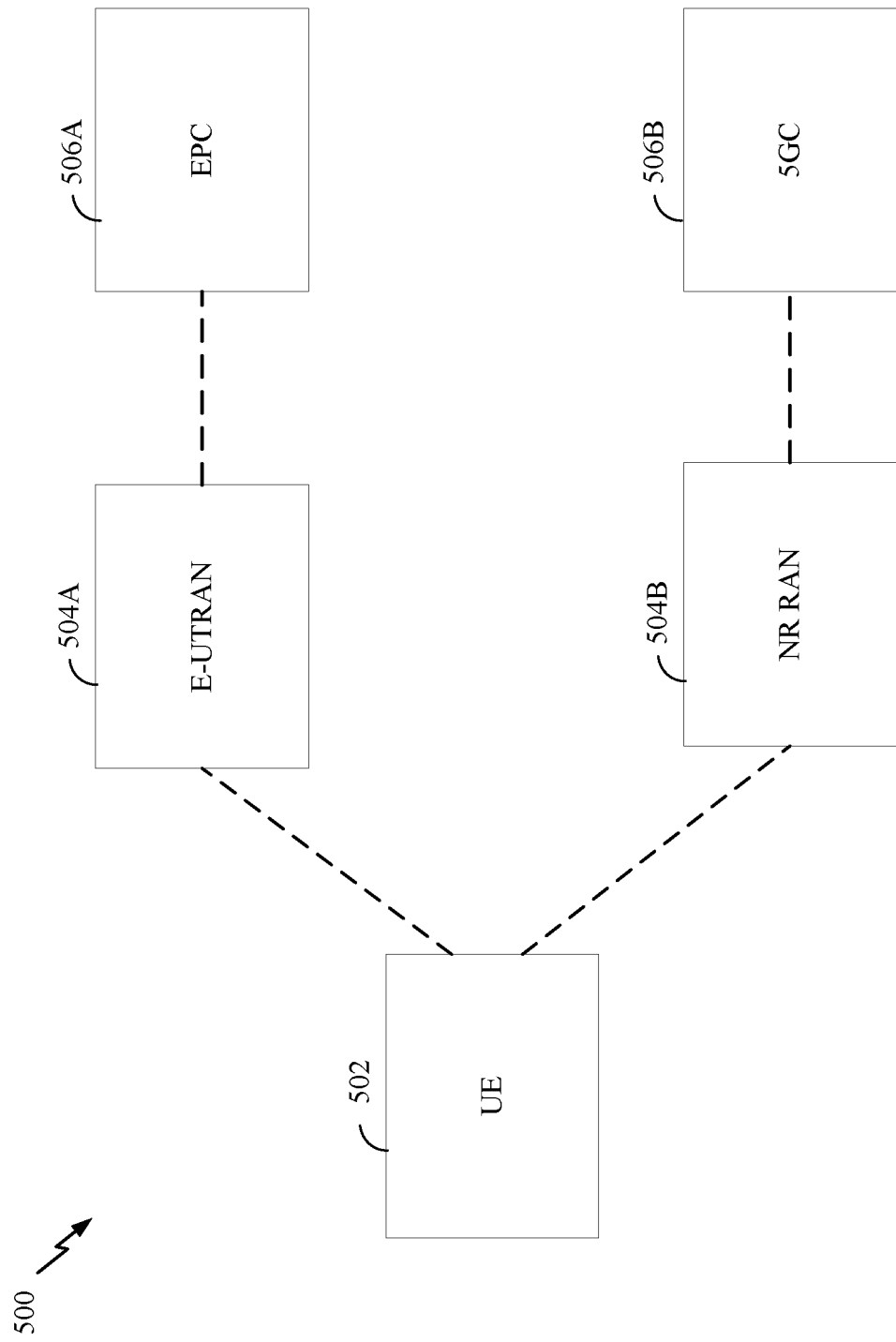
FIG. 5 illustrates an example system architecture for interworking between a 5G System (5GS) and an evolved universal mobile telecommunication system network (E-UTRAN) system, in accordance with certain aspects of the present disclosure.

FIG. 5 illustrates an example system architecture 500 for interworking between 5GS (e.g., such as the distributed RAN 200) and E-UTRAN-EPC, in accordance with certain aspects of the present disclosure. As shown in FIG. 5, the UE 502 may be served by separate RANs 504A and 504B controlled by separate core networks 506A and 506B, where the RAN 504A provides E-UTRA services and RAN 504B provides 5G NR services. The UE may operate under only one RAN/CN or both RANs/CNs at a time.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
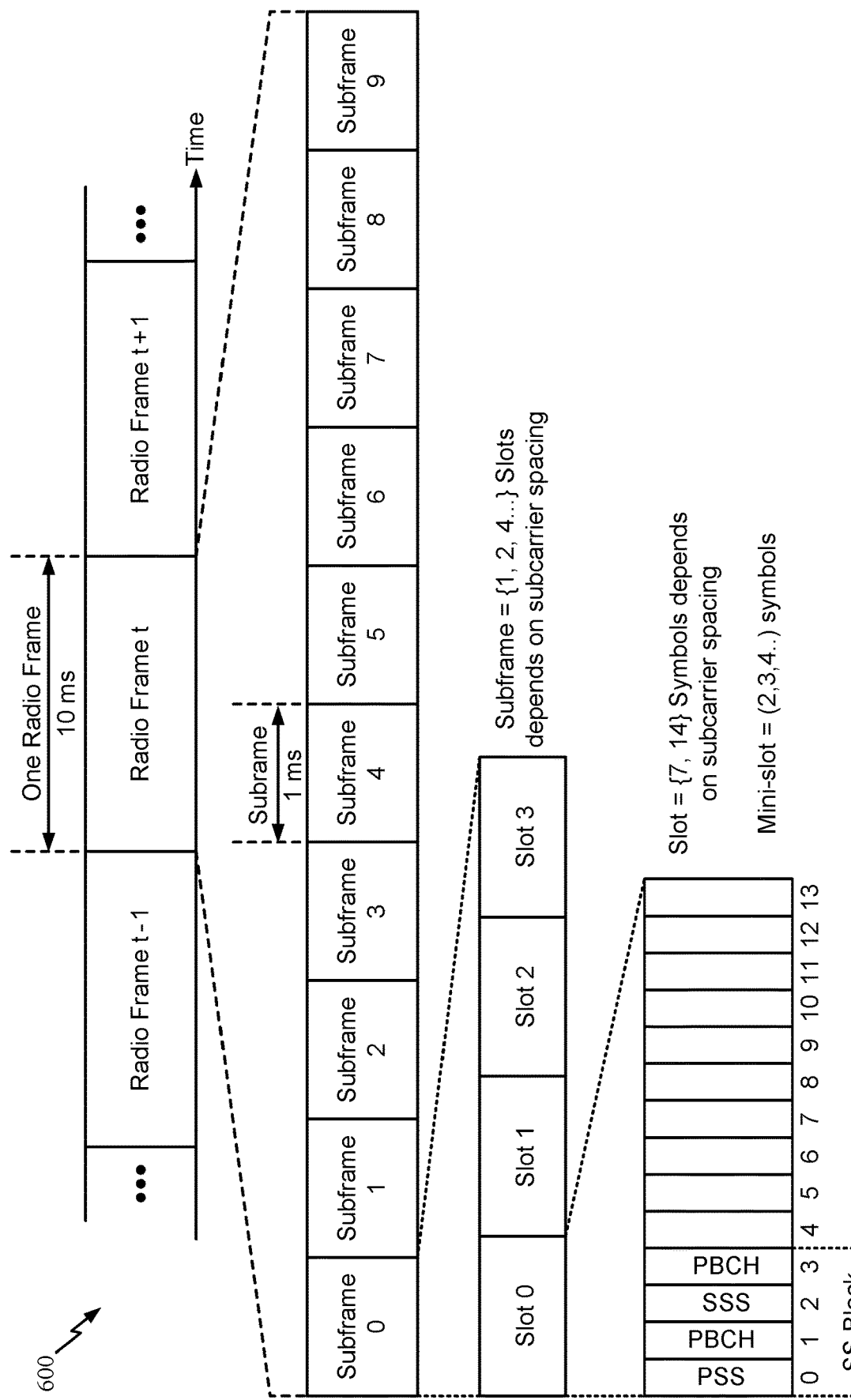
FIG. 6 illustrates an example of a frame format for a telecommunication system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example RACH Power Control Procedure

A random-access channel (RACH) is so named because it refers to a wireless channel (medium) that may be shared by multiple UEs and used by the UEs to (randomly) access the network for communications. For example, the RACH may be used for call setup and to access the network for data transmissions. In some cases, RACH may be used for initial access to a network when the UE switches from a radio resource control (RRC) connected idle mode to active mode, or when handing over in RRC connected mode. Moreover, RACH may be used for downlink (DL) and/or uplink (UL) data arrival when the UE is in RRC idle or RRC inactive modes, and when reestablishing a connection with the network.

Figure 7:
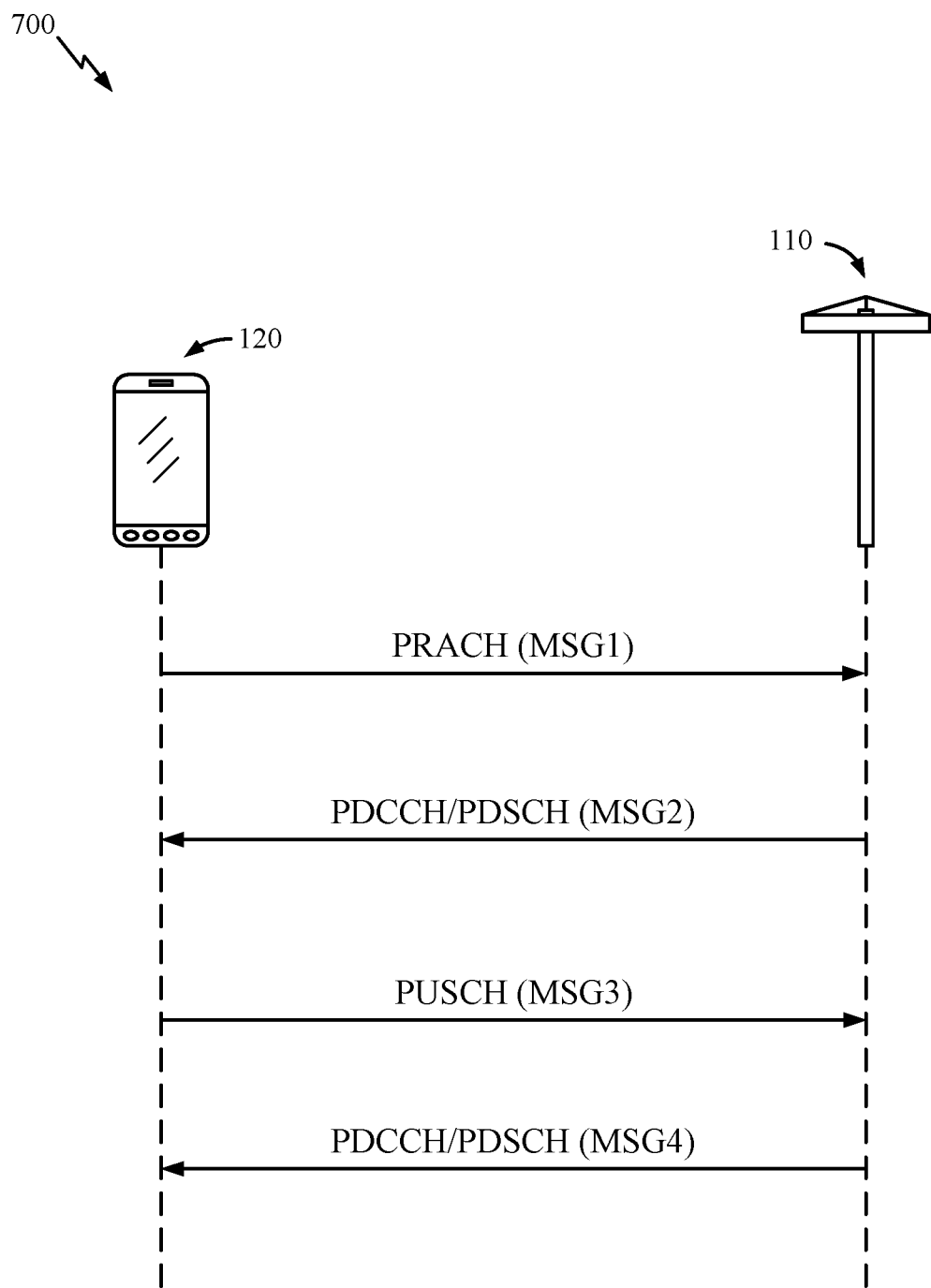
FIG. 7 is a timing diagram illustrating an example four-step RACH procedure, in accordance with certain aspects of the present disclosure.

FIG. 7 is a timing (or "call-flow") diagram 700 illustrating an example four-step RACH procedure, in accordance with certain aspects of the present disclosure. A first message (MSG1) may be sent from the UE 120 to BS 110 on the physical random access channel (PRACH). In this case, MSG1 may only include a RACH preamble. BS 110 may respond with a random access response (RAR) message (MSG2) which may include the identifier (ID) of the RACH preamble, a timing advance (TA), an uplink grant, cell radio network temporary identifier (C-RNTI), and a back off indicator. MSG2 may include a PDCCH communication including control information for a following communication on the PDSCH, as illustrated. In response to MSG2, MSG3 is transmitted from the UE 120 to BS 110 on the PUSCH. MSG3 may include one or more of a RRC connection request, a tracking area update request, a system information request, a positioning fix or positioning signal request, or a scheduling request. The BS 110 then responds with MSG 4 which may include a contention resolution message.

In some cases, to speed access, a two-step RACH procedure may be supported. As the name implies, the two-step RACH procedure may effectively "collapse" the four messages of the four-step RACH procedure into two messages.

Figure 8:
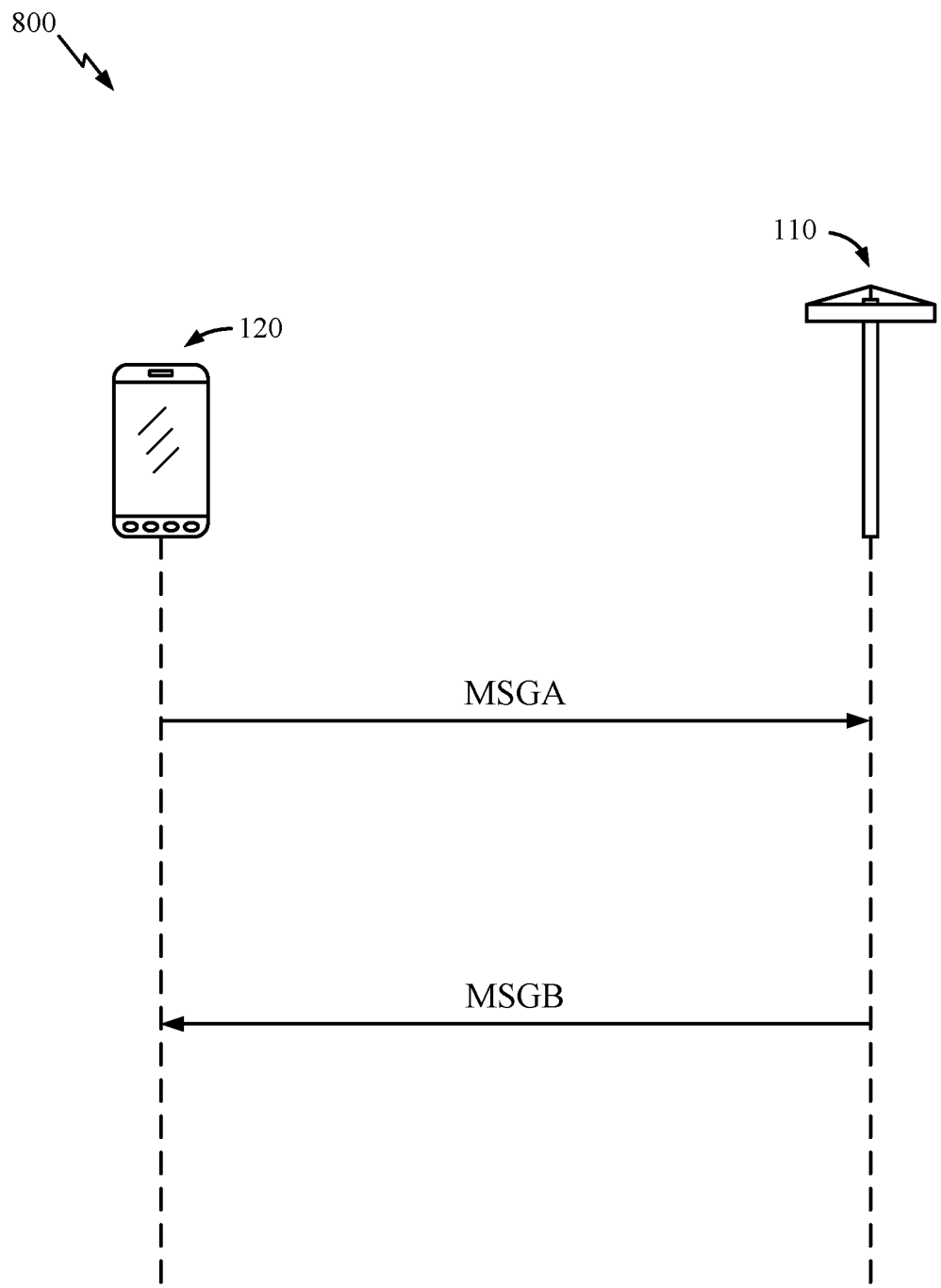
FIG. 8 is a timing diagram illustrating an example two-step RACH procedure, in accordance with certain aspects of the present disclosure.

FIG. 8 is a timing diagram 800 illustrating an example two-step RACH procedure, in accordance with certain aspects of the present disclosure. A first enhanced message (MSGA) may be sent from the UE 120 to BS 110. In certain aspects, MSGA includes some or all the information from MSG1 and MSG3 from the four-step RACH procedure, effectively combining MSG1 and MSG3. For example, MSGA may include MSG1 and MSG3 multiplexed together such as using one of time-division multiplexing or frequency-division multiplexing. In certain aspects, MSGA includes a RACH preamble for random access and a payload. The MSGA payload, for example, may include the UE-ID and other signaling information (e.g., buffer status report (BSR)) or scheduling request (SR). BS 110 may respond with a random access response (RAR) message (MSGB) which may effectively combine MSG2 and MSG4 described above. For example, MSGB may include the ID of the RACH preamble, a timing advance (TA), a back off indicator, a contention resolution message, UL/DL grant, and transmit power control (TPC) commands.

In certain aspects, with respect to the four-step RACH procedure, UE 120 is configured to perform power control for transmission of MSG1 and MSG 3. In particular, when sending uplink transmissions, such as MSG1 and MSG3, UE 120 may need to determine a value of transmit power to apply. The value is typically chosen to be just high enough that BS 110 can successfully decode the transmission, while mitigating interference to (uplink and/or downlink transmissions of) other UEs.

In some cases, UE 120 is configured with power control configurations involving various parameters to use in an equation the UE 120 uses to determine transmit power for uplink transmissions from the UE. For example, the UE 120 may determine MSG1 transmit power, according to the following equation:

$$P_{PRACH,b,f,c}(i) = \min\{P_{CMAX,f,c}(i), P_{RACH,target,f,c} + PL_{b,f,c}\}$$

involving the following parameters:

$P_{PRACH,b,f,c}$ (i) is the transmit power for transmitting MSG1 for uplink bandwidth part (BWP) b, of carrier frequency f of serving cell c, for transmission occasion i, wherein a transmission occasion may occur periodically (e.g., as part of a synchronization signal block (SSB) burst set (SS burst set) configuration) and may either be configured at UE 120 using RRC signaling by BS 110 to UE 120 or UE 120 may use a default value when not configured otherwise;

$P_{CMAX}$, f, c (i) is the configured maximum UE 120 output power (e.g., configured via RRC signaling by BS 110) for carrier frequency f of service cell c in each slot (e.g., transmission occasion i);

$P_{RACH, target, f,c}$ is the MSG1 target reception power at BS 110; and $PL_{b,f,c}$ is the pathloss for the active UL BWP b, of carrier frequency f based on the downlink reference signal associated with the MSG1 transmission on the active DL BWP of serving cell c.

In particular, the transmit power for transmitting MSG1 is based on a desired target power for the MSG1 to be received at BS 110 and accounting for pathloss.

In certain aspects, UE 120 is configured to keep transmitting MSG1 to BS 110 over multiple transmission occasions i until the UE 120 receives MSG2 from BS 110 (or a RACH failure is declared by UE 120 after too much time has passed or too many retransmissions). In particular, BS 110 may not successfully receive MSG1 from UE 120, and therefore does not send MSG2 until MSG1 is successfully received, so UE 120 keeps attempting to send MSG1. In certain aspects, as the transmission occasion increases, the transmit power used to transmit MSG1 by UE 120 may increase, thereby increasing the chance that it is successfully received by BS 110. For example, the following equation is used to calculate $P_{RACH, target,f,c}$:

$$P_{RACH,target,f,c} = \text{preambleReceivedTargetPower} + \text{DELTA\_PREAMBLE} + (\text{PREAMBLE\_POWER\_RAMPING\_COUNTER} - 1) * \text{PREAMBLE\_POWER\_RAMPING\_STEP}$$

involving the following parameters:

preambleReceivedTargetPower is configured at UE 120 by BS 110 using RRC signaling;

DELTA_PREAMBLE may be determined by predefined tables such as indicated in 3GPP TS 38.321, such as based on the preamble format used for MSG1;

PREAMBLE_POWER_RAMPING_COUNTER starts from 0 and gets incremented by 1 every time MSG1 is retransmitted; and PREAMBLE_POWER_RAMPING_STEP may be configured at UE 120 by BS 110 using RRC signaling (e.g., as one of two values corresponding to a regular priority having a smaller value and a higher priority having a larger value depending on the reason for the performance of the RACH procedure, such as for handover, beam failure recover (BFR), etc.).

In certain aspects, the UE 120 is configured to transmit MSG1 over multiple spatial beams. In certain such aspects, UE 120 transmits MSG1 using the same transmit power over each spatial beam as part of one transmission occasion i, and then if needed retransmits at the next transmit power over each spatial beam as part of a next transmission occasion i+1.

Further, the UE 120 may determine MSG3 transmit power control, according to the following equations:

$$P_{PUSCH,b,f,c}(i, j, q_d, l) = \min\left\{\begin{array}{l}P_{CMAX,f,c}(i),\\P_{O\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l)\end{array}\right\};$$

$$f_{b,f,c}(0, l) = \Delta P_{rampup,b,f,c} + \delta_{msg2,b,f,c};$$

$$j = l = 0;$$

$$\Delta P_{rampup,b,f,c} = \min\left[\left\{\max\left(0, P_{CMAX,f,c} - \left(\begin{array}{l}10\log_{10}(2^\mu \cdot M_{RB,b,f,c}^{PUSCH}(0)) +\\P_{O\_PUSCH,b,f,c}(0) + \alpha_{b,f,c}(0) \cdot PL_c +\\\Delta_{TF,b,f,c}(0) + \delta_{msg2,b,f,c}\end{array}\right)\right)\right\}, \Delta P_{rampuprequested,b,f,c}\right]$$

involving the following parameters:

pathloss reference qd is the reference signal index for the active DL BWP (e.g., same as the equation for MSG1);

$P_{O\_PUSCH,b,f,c}$=preambleReceivedTargetPower+msg3-DeltaPreamble, where msg3-DeltaPreamble is the power offset between MSG3 and RACH preamble transmission in steps of 1 dB, and is configured at UE 120 by BS 110 using RRC;

α=msg3-Alpha, and is configured at UE 120 by BS 110 using RRC;

M is proportional to the number of resource blocks (RBs) used for MSG3 transmission and therefore indicative of the frequency width of transmission;

μ is indicative of the numerology used for MSG3 transmission and therefore also indicative of the frequency width of transmission;

$\Delta_{TF}$ is indicative of the modulation coding scheme (MCS) used for MSG3 transmission; and $\delta_{msg2}$ corresponds to a TPC command in MSG2.

Accordingly, the MSG3 power control performed by UE 120 may account for a MCS used for transmission, a tone assignment, path loss, and a power control command received from BS 110.

In certain aspects, $\Delta P_{rampuprequested,b,f,c}$ is the total power ramp-up after successive PRACH preambles and equals (e.g., from the equation for MSG1): $\Delta P_{rampuprequested,b,f,c}$= (PREAMBLE_POWER_RAMPING_COUNTER−1) *PREAMBLE_POWER_RAMPING_STEP.

Accordingly, in certain aspects, UE 120 uses the same additional power for each retransmission of MSG3 as it uses for MSG1. In particular, UE 120 is configured to retransmit MSG3 (e.g., periodically, or in response to scheduled msg3 HARQ retransmissions) until MSG4 is received (or a RACH failure is declared by UE 120 after too much time has passed or too many retransmissions or failing to receive scheduling grants for MSG3 retransmissions) from BS 110, similar to MSG1.

As discussed, in certain aspects UE 120 uses a 2-step RACH procedure instead of a 4-step RACH procedure. Accordingly, certain aspects herein relate to power control performed by a UE 120 (e.g., and configured by a BS 110) for transmitting MSGA.

As discussed, in certain aspects MSGA is effectively a combination of MSG1 and MSG3. In certain aspects, for transmission of the MSG1 portion of MSGA, UE 120 applies the same power control scheme as discussed for MSG1.

In certain aspects, for transmission of the MSG3 portion of MSGA, UE 120 applies a modified power control scheme as compared to that discussed for MSG3 as discussed hereinafter.

In certain aspects, the transmit power for the MSG3 portion of MSGA is calculated by UE 120 based on the value of the PREAMBLE_POWER_RAMPING_COUNTER used for calculating transmit power of MSG1 in the same MSGA. Further, the counter is incremented after each transmission of MSGA. Accordingly, the same additional power used by UE 120 for transmitting the MSG1 portion of MSGA is used for transmitting the MSG3 portion of MSGA (e.g., the transmit power for MSG3 is based on the latest $\Delta P_{rampup,b,f,c}$ associated with its corresponding MSG1 in MSGA).

In certain aspects, $\delta_{msg2}$ is set to 0. For example, UE 120 may not receive or be able to read (e.g., decode and process) information corresponding to MSG2, including $\delta_{msg2}$, received from BS 110 (e.g., in MSGB) in between transmission of the MSG1 part and the MSG3 part of MSGA. Therefore, UE 120 defaults to set to $\delta_{msg2}$ 0.

In certain aspects, if the MSG1 part of MSGA and the MSG3 part of MSGA are separated in time, and there is enough time to read part of MSGB after transmission of the MSG1 part and before transmission of the MSG3 part of MSGA by UE 120, $\delta_{msg2}$ is set based on the information from MSGB sent by BS 110 in response to the same MSGA. For example, UE 120 may be configured to read only a PDCCH that schedules the PDSCH carrying the MSGB payload in the time between transmission of the MSG1 part and transmission of the MSG3 part of MSGA, and $\delta_{msg2}$ may be carried in the PDCCH for UE 120.

In certain aspects, MSGA includes one MSG1 and multiple copies of MSG3. In certain aspects, each copy of MSG3 may have a copy-dependent offset term added, meaning the UE 120 is configured to determine a different transmit power for each copy of MSG3 in MSGA. For example, each copy of MSG3 may be transmitted by UE 120 using a different timing advance (TA), a timing advance indicating an offset in time of when to transmit by the UE 120. In particular, in between transmission of the MSG1 and MSG3 parts of MSGA, UE 120 may not have time to receive TA information from BS 110 and therefore does not know what TA to use to ensure that transmissions from UE 120 are received at BS 110 at the time the BS 110 is expecting them. In particular, the BS 110 may configure multiple UEs 120 with TAs so that the MSG3s arrive around the same time at BS 110 so it can receive all of them during one period. Without such TA information from BS 110, UE 120 may attempt to transmit copies of MSG3 parts of MSGA each with a different TA so that potentially one of the copies of MSG3 arrives at BS 110 at the appropriate time. In certain aspects, UE 120 is configured to determine a higher transmit power for transmitting copies of MSG3 in MSGA with TAs that UE 120 determines are less likely to be correct, and determine a lower transmit power for transmitting copies of MSG3 in MSGA with TAs that UE 120 determines are more likely to be correct. In particular, by transmitting MSG3 copies using TAs that are less likely with a higher power, it is more likely that those MSG3 copies are still received successfully by BS 110.

In certain aspects, each copy of MSG3 may be transmitted by UE 120 using different transmit beams or panels, and $P_{CMAX}, f, c$ (i) may be beam or panel-specific.

In certain aspects, UE 120 may fall back from a 2-step RACH procedure to a 4-step RACH procedure in a number of different scenarios. For example, a 2-step RACH procedure may not succeed due to a path loss and larger timing advance (TA). As another example, a BS 110 may only detect a preamble of the MSGA, but not the payload portion when a UE starts in the 2-step RACH procedure. In this case, the UE may continue the RACH procedure with 4-step.

It should be noted that, in certain aspects, the term "fall back" as used herein for falling back from a 2-step RACH procedure to a 4-step RACH procedure may specifically refer to the UE 120 switching from using a 2-step RACH procedure to a 4-step RACH procedure. In particular, the UE 120 switches from sending MSGA to sending MSG1 and waiting for MSG2 before sending MSG3 as discussed.

Alternatively or additionally, in certain aspects, the use of the term "fall back" herein refers to where UE 120 falls back by transmitting only the MSG3 part of MSGA and not both the MSG1 part and MSG3 part for retransmissions.

In certain aspects, different parameters used for power control for MSGA (e.g., for MSG1 part and/or MSG3 part) may be configured separately for 2-step RACH procedure and 4-step RACH procedure. For example, BS 110 may use RRC signaling to configure one set of parameters (e.g., PREAMBLE_POWER_RAMPING_STEP, DELTA_PREAMBLE, etc.) for use when performing 2-step RACH procedure, and another set of parameters for use when performing 4-step RACH procedure. In certain aspects, only one set of parameters is configured for both 2-step RACH procedure and 4-step RACH procedure. In certain aspects, for certain parameters a single value is configured for both 2-step RACH procedure and 4-step RACH procedure, and for other parameters different values are configured for each of 2-step RACH procedure and 4-step RACH procedure.

In certain aspects, in addition or alternative to separate parameters (e.g., all or some) being configured at UE 120 by BS 110 for 2-step RACH procedure and 4-step RACH procedure, separate parameters (e.g., all or some) are configured for use for the 4-step portion (referred to as 4-step fall back RACH procedure) of the RACH procedure when the UE 120 falls back from a 2-step RACH procedure to a 4-step RACH procedure. In certain aspects, whether the regular 4-step RACH procedure parameters are used by UE 120 for power control, or the 4-step fall back RACH procedure parameters are used when the UE 120 falls back is based on the reason for the fall back (e.g., whether the fall back is based on a determination made by the UE 120 itself, or whether it was directed by the BS 110). For example, if the UE 120 falls back due to bad signal quality when using the 2-step RACH procedure, it may use the 4-step fall back RACH procedure parameters.

In certain aspects, different parameters used for power control for MSGA (e.g., for MSG1 part and/or MSG3 part) may be determined as functions of payload type associated with the MSGA. In particular, payload type can include a quality of service (QoS)/priority flow associated with the UL traffic UE 120 has to send to BS 110 and therefore based on this payload to send the UE 120 is performing the RACH procedure and transmitting MSGA. Payload type can include a reason for connection request by the UE 120 to the BS 110. Payload type, in certain aspects, excludes a number of RBs used for transmitting MSGA and a MCS used for MSGA, since these parameters may be already accounted for in the equation for determining transmit power of the PUSCH carrying the payload, as described earlier. In certain aspects, such parameters may therefore change from one MSGA retransmission to the next as the payload may change, such as depending on available power at the UE 120 for transmitting MSGA.

In certain aspects, AT for determining transmit power for MSG3 in 2-step RACH procedure is different from its value in connected mode (e.g., and the same could apply to the 4-step RACH procedure).

In certain aspects, UE 120 is configured to initiate fall back from 2-step RACH procedure to 4-step RACH procedure based on power control. For example, if MSG1 part or MSG3 part of MSGA hit their max power in 2-step RACH procedure, the UE 120 may fall back to the 4-step RACH procedure.

In certain aspects, UE 120 is not allowed to go back to a 2-step RACH procedure after falling back to a 4-step RACH procedure. In certain aspects, UE 120 is allowed to go back to a 2-step RACH procedure (e.g., after expiration of a backoff timer/after a certain period of time).

During 4-step fall back RACH procedure, in certain aspects UE 120 restarts power control as though it has just initiated a new RACH procedure (e.g., PREAMBLE_POWER_RAMPING_COUNTER is set to 0 or 1). In certain aspects, for 4-step fall back RACH procedure, UE 120 continues ramping up transmit power for MSG1/MSG3 from the transmit power used for MSGA during the 2-step RACH procedure prior to fall back. In certain aspects, the UE 120 determines whether to continue ramping transmit power or restart power control based on a reason for fall back (e.g., UE initiated, BS initiated, handover, etc.), a message from BS 110, or an indication from BS 110.

In certain aspects, for 4-step fall back RACH procedure, when UE 120 continues ramping transmit power, UE 120 is configured to use the same PREAMBLE_POWER_RAMPING_COUNTER. In certain such aspects, UE 120 utilizes a different PREAMBLE_POWER_RAMPING_STEP value for the 2-step RACH procedure (e.g., $step_2$) and for the 4-step fall back RACH procedure when calculating transmit power (e.g., $step_4$). For example for 2-step RACH procedure:

$$P_{RACH,target,f,c} = \text{preambleReceivedTargetPower} + \text{DELTA\_PREAMBLE} + (\text{PREAMBLE\_POWER\_RAMPING\_COUNTER} - 1) * step_2; \text{ and}$$

$$\Delta P_{rampup,b,f,c} = (\text{PREAMBLE\_POWER\_RAMPING\_COUNTER} - 1) * step_2.$$

Further, for 4-step fall back RACH procedure:

$$P_{RACH,target,f,c} = \text{preambleReceivedTargetPower} + \text{DELTA\_PREAMBLE} + (\text{PREAMBLE\_POWER\_RAMPING\_COUNTER} - 1) * \text{step}_4; \text{ and}$$

$$\Delta P_{rampup,b,f,c} = (\text{PREAMBLE\_POWER\_RAMPING\_COUNTER} - 1) * \text{step}_4$$

In certain aspects, for 4-step fall back RACH procedure, when UE 120 continues ramping transmit power, UE 120 is configured to use a different PREAMBLE_POWER_RAMPING_COUNTER for each of the 2-step RACH procedure (e.g., counter2) and the 4-step fall back RACH procedure (e.g., counter4). For example, the UE 120 for a given RACH increments counter2 for retransmissions of MSGA using the 2-step RACH procedure and increments counter4 for retransmissions of MSG1 using the 4-step RACH procedure. Further, UE 120 utilizes a different PREAMBLE_POWER_RAMPING_STEP value for the 2-step RACH procedure (e.g., step2) and for the 4-step fall back RACH procedure when calculating transmit power (e.g., step4). For example:

$$P_{RACH,target,f,c} = \text{preambleReceivedTargetPower} + \text{DELTA\_PREAMBLE} + (\text{counter}_2 - 1) * \text{step}_2 + (\text{counter}_4 - 1) * \text{step}_4; \text{ and}$$

$$\Delta P_{rampup,b,f,c} = (\text{counter}_2 - 1) * \text{step}_2 + (\text{counter}_4 - 1) * \text{step}_4.$$

In certain aspects, UE 120 maintains a transmit counter, which the UE 120 increments after each transmission of a preamble for RACH procedure. In certain aspects, when the transmit counter reaches a threshold, the UE 120 declares a RACH failure. In certain aspects, the transmit counter follows similar rules as the PREAMBLE_POWER_RAMPING_STEP (also referred to as a power-ramping counter) discussed herein.

In certain aspects, during 4-step fall back RACH procedure, UE 120 restarts the transmit counter as though it has just initiated a new RACH procedure (e.g., transmit counter is set to 0).

In certain aspects, the UE 120 keeps track of two different thresholds for the transmit counter, a first threshold for the 2-step RACH procedure (a lower threshold), and a second threshold for the 4-step RACH procedure (a higher threshold). In certain aspects, when the transmit counter hits the first threshold, the UE 120 falls back from the 2-step RACH procedure to the 4-step RACH procedure. The UE 120 may not declare a RACH failure at this point, such as to upper layers, but may instead determine that for future RACH procedures on the same carrier, to not use 2-step RACH procedure. This may be based on the reason for fall back. When the transmit counter hits the second threshold when using the 4-step RACH procedure, the UE 120 may declare a RACH failure.

In certain aspects, the UE 120 is configured with separate transmit counters for 2-step RACH procedure and 4-step RACH procedure, such as when UE 120 is allowed to return to 2-step after 4-step fall back. In certain aspects, when the transmit counter for the 2-step RACH procedure reaches a threshold, or the transmit counter for the 4-step RACH procedure reaches a threshold (same or different), UE 120 declares a RACH failure. In certain aspects, when the transmit counter for the 2-step RACH procedure reaches the threshold, UE 120 may not declare a RACH failure at this point, such as to upper layers, but may instead determine that for future RACH procedures on the same carrier, to not use 2-step RACH procedure. This determination may be based on the reason for fall back.

Figure 9:
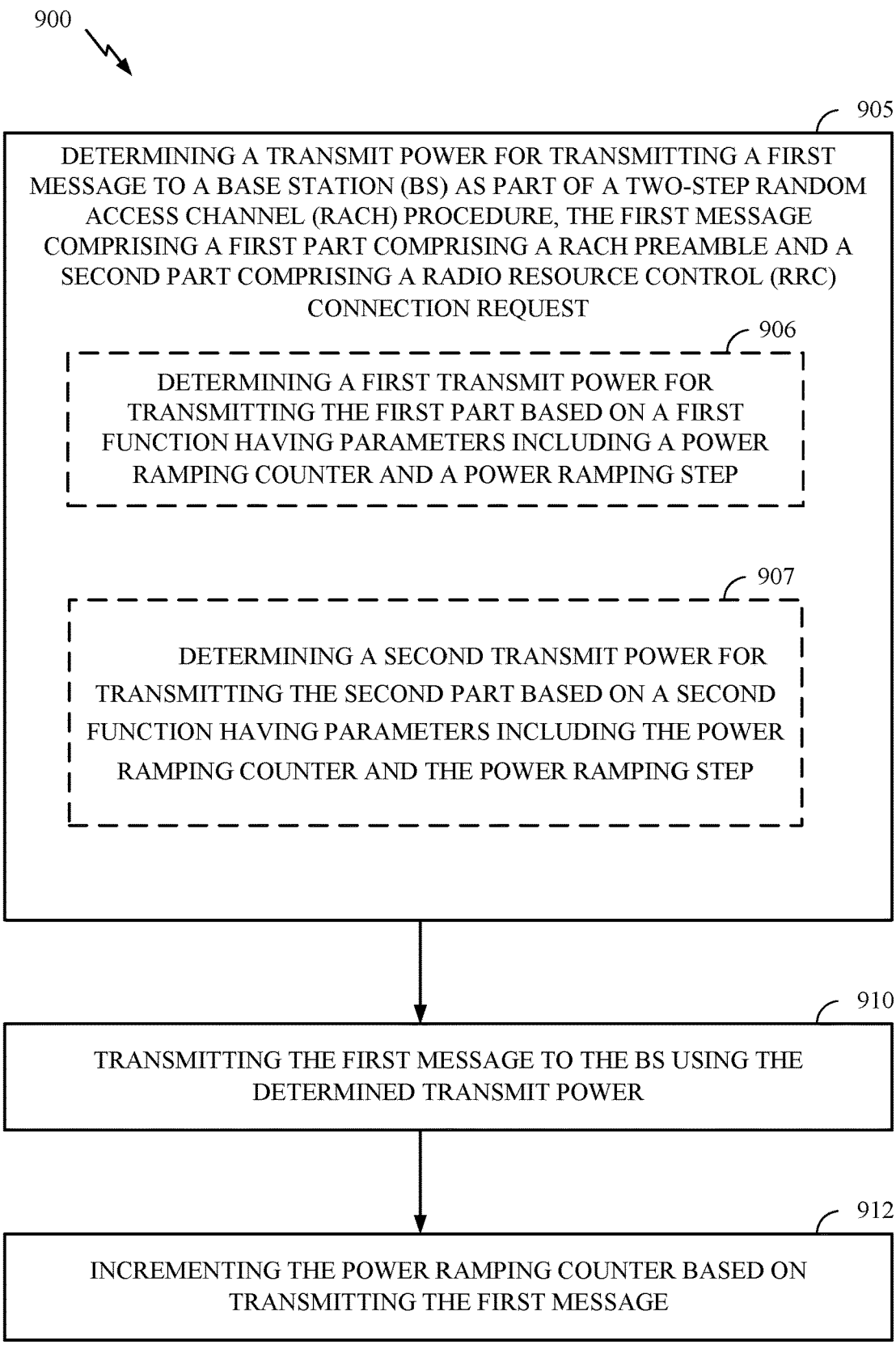
FIG. 9 is a flow diagram illustrating example operations for wireless communication by a UE, in accordance with certain aspects of the present disclosure.

FIG. 9 is a flow diagram illustrating example operations 900 for wireless communication, in accordance with certain aspects of the present disclosure. The operations 900 may be performed, for example, by UE (e.g., such as a UE 120 in the wireless communication network 100). The operations 900 may be complimentary operations by the UE to operations performed by the BS. Operations 900 may be implemented as software components that are executed and run on one or more processors (e.g., processor 480 of FIG. 4). Further, the transmission and reception of signals by the UE in operations 900 may be enabled, for example, by one or more antennas (e.g., antennas 452 of FIG. 4). In certain aspects, the transmission and/or reception of signals by the UE may be implemented via a bus interface of one or more processors (e.g., processor 480) obtaining and/or outputting signals.

The operations 900 may begin, at block 905, by determining a transmit power for transmitting a first message to a base station (BS) as part of a two-step random access channel (RACH) procedure, the first message comprising a first part comprising a RACH preamble and a second part comprising a radio resource control (RRC) connection request. As shown, the determining at block 905 includes blocks 906 and 907. At block 906, the UE determines a first transmit power for transmitting the first part based on a first function having parameters including a power ramping counter and a power ramping step. At block 907 the UE determines a second transmit power for transmitting the second part based on a second function having parameters including the power ramping counter and the power ramping step.

Continuing at block 910, the UE transmits the first message to the BS using the determined transmit power. Further, at block 912, the UE increments the power ramping counter based on transmitting the first message.

In certain aspects, the parameters of the second function further include a variable based on a transmit power control (TPC) command received from the BS, and when the UE is unable to determine the TPC command from the BS between transmission of the first part and the second part, the UE sets the variable to a default value. In certain such aspects, when the UE is able to determine the TPC command from the BS between transmission of the first part and the second part, the UE sets the variable based on the TPC command. In certain such aspects, the TPC command is received in a physical downlink control channel (PDCCH).

In certain aspects, the first message comprises a plurality of copies of the second part, and determining the second transmit power for the second part comprises determining a plurality of transmit powers for the plurality of copies. In certain such aspects, the plurality of transmit powers are based on a plurality of timing advances associated with the plurality of copies. In certain such aspects, the plurality of transmit powers are based on transmit beams or panels associated with the plurality of copies.

In certain aspects, operations 900 further include determining a third transmit power for transmitting the first part as part of a four-step RACH procedure based on the first function having possible different values for one or more of the parameters than for the two-step RACH procedure; and determining a fourth transmit power for transmitting the second part as part of the four-step RACH procedure based on the second function having possible different values for one or more of the parameters than for the two-step RACH procedure.

In certain such aspects, operations 900 further include determining a fifth transmit power for transmitting the first part as part of a four-step fall back RACH procedure after falling back from the two-step RACH procedure based on the first function having possible different values for one or more of the parameters than for the two-step RACH procedure and the four-step RACH procedure; and determining a sixth transmit power for transmitting the second part as part of the four-step fall back RACH procedure based on the second function having possible different values for one or more of the parameters than for the two-step RACH procedure and the four-step RACH procedure.

In certain aspects, one or more of the parameters of one or more of the first function and the second function are a function of a payload type for which the UE is performing RACH. In certain such aspects, the payload type is based on one or more of a quality of service, priority flow, or reason for connection request.

In certain aspects, operations 900 further include falling back to a four-step RACH procedure based on one or more of the first transmit power reaching a first maximum power and the second transmit power reaching a second maximum power.

In certain aspects, operations 900 further include falling back to a four-step RACH procedure, wherein the power ramping counter is reset based on the falling back.

In certain aspects, operations 900 further include falling back to a four-step RACH procedure, wherein the power ramping counter is maintained after the falling back. In certain such aspects, the power ramping step has a first value for the two-step RACH procedure and a second value for the four-step RACH procedure.

In certain aspects, operations 900 further include falling back to a four-step RACH procedure; and determining whether to reset the power ramping counter based on a reason for the falling back.

In certain aspects, operations 900 further include incrementing a single transmit counter for each retransmission of the first message; falling back to a four-step RACH procedure; and resetting the single transmit counter based on the falling back.

In certain aspects, operations 900 further include incrementing a single transmit counter for each retransmission of the first message; determining if the single transmit counter has reached a first threshold; falling back to a four-step RACH procedure when the single transmit counter reaches the first threshold; and declaring a RACH failure when the single transmit counter reaches a second threshold.

In certain aspects, operations 900 further include incrementing a first transmit counter for each retransmission of the first message as part of the two-step RACH procedure; incrementing a second transmit counter for each retransmission of the first part as part of a four-step RACH procedure; determining if the first transmit counter has reached a first threshold; falling back to the four-step RACH procedure when the first transmit counter reaches the first threshold; and declaring a RACH failure when the second transmit counter reaches a second threshold.

Figure 10:
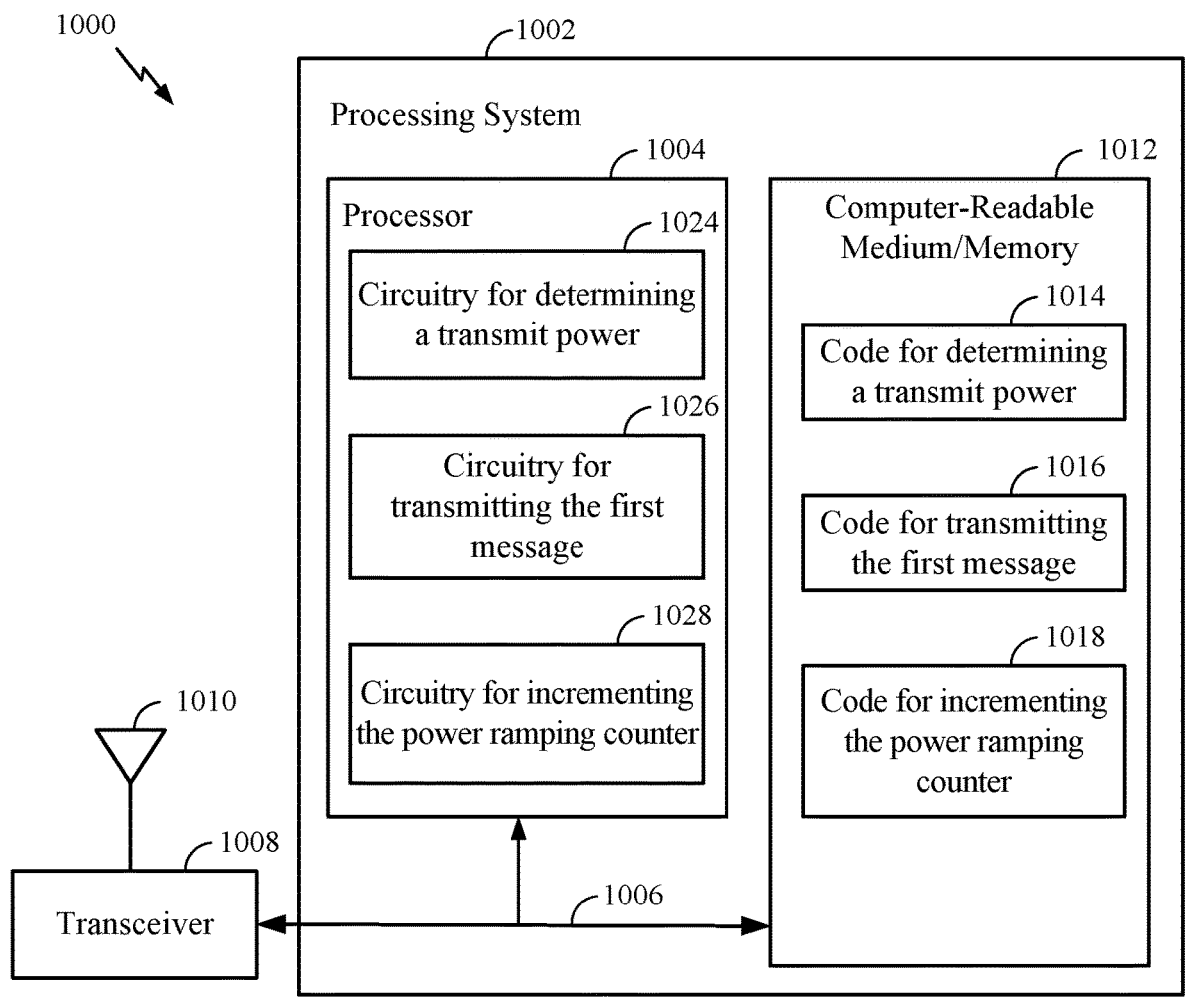
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 9. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 9 or other operations for performing the various techniques discussed herein for RACH power control. In certain aspects, computer-readable medium/memory 1012 stores code for determining a transmit power 1014, code for transmitting the first message 1016, and code for incrementing the power ramping counter 1018. In certain aspects, the processor 1004 has circuitry configured to implement the code stored in the computer-readable medium/memory 1012. The processor 1004 includes circuitry for determining a transmit power 1024, circuitry for transmitting the first message 1026, and circuitry for incrementing the power ramping counter 1028.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
    determining a transmit power for transmitting a first message to a base station (BS) as part of a two-step random access channel (RACH) procedure, the first message comprising a first part comprising a RACH preamble and a second part comprising a radio resource control (RRC) connection request, wherein determining the transmit power comprises:
        determining a first transmit power for transmitting the first part based on a first function having parameters including a power ramping counter and a power ramping step; and
        determining a second transmit power for transmitting the second part based on a second function having parameters including the power ramping counter and the power ramping step, wherein one or more of the parameters of one or more of the first function or the second function are a function of a payload type for which the user equipment is performing RACH, and wherein the one or more of the parameters of the one or more of the first function or the second function change from a first transmission of the first message to a second transmission of the first message based on a change in payload of the first message from the first transmission to the second transmission;
    transmitting the first message to the BS using the determined transmit power; and
    incrementing the power ramping counter based on transmitting the first message.

2. The method of claim 1, further comprising:
    determining a third transmit power for transmitting the first part as part of a four-step RACH procedure based on the first function having possible different values for one or more of the parameters than for the two-step RACH procedure; and
    determining a fourth transmit power for transmitting the second part as part of the four-step RACH procedure based on the second function having possible different values for one or more of the parameters than for the two-step RACH procedure.

3. The method of claim 2, further comprising:
    determining a fifth transmit power for transmitting the first part as part of a four-step fall back RACH procedure after falling back from the two-step RACH procedure based on the first function having possible different values for one or more of the parameters than for the two-step RACH procedure and the four-step RACH procedure; and
    determining a sixth transmit power for transmitting the second part as part of the four-step fall back RACH procedure based on the second function having possible different values for one or more of the parameters than for the two-step RACH procedure and the four-step RACH procedure.

4. The method of claim 1, wherein the payload type is based on one or more of a quality of service, priority flow, or reason for connection request.

5. The method of claim 1, further comprising falling back to a four-step RACH procedure based on one or more of the first transmit power reaching a first maximum power or the second transmit power reaching a second maximum power.

6. The method of claim 1, further comprising falling back to a four-step RACH procedure, wherein the power ramping counter is maintained after the falling back.

7. The method of claim 6, wherein the power ramping step has a first value for the two-step RACH procedure and a second value for the four-step RACH procedure.

8. The method of claim 1, further comprising:
    incrementing a single transmit counter for each retransmission of the first message;
    determining if the single transmit counter has reached a first threshold;
    falling back to a four-step RACH procedure when the single transmit counter reaches the first threshold; and
    declaring a RACH failure when the single transmit counter reaches a second threshold.

9. A user equipment comprising:
    a memory; and
    a processor coupled to the memory, the processor configured to:
        determine a transmit power for transmitting a first message to a base station (BS) as part of a two-step random access channel (RACH) procedure, the first message comprising a first part comprising a RACH preamble and a second part comprising a radio resource control (RRC) connection request, wherein to determine the transmit power comprises to:
            determine a first transmit power for transmitting the first part based on a first function having parameters including a power ramping counter and a power ramping step; and
            determine a second transmit power for transmitting the second part based on a second function having parameters including the power ramping counter and the power ramping step, wherein one or more of the parameters of one or more of the first function or the second function are a function of a payload type for which the user equipment is performing RACH, and wherein the one or more of the parameters of the one or more of the first function or the second function change from a first transmission of the first message to a second transmission of the first message based on a change in payload of the first message from the first transmission to the second transmission;
        transmit the first message to the BS using the determined transmit power; and
        increment the power ramping counter based on transmitting the first message.

10. The user equipment of claim 9, wherein the processor is further configured to:

determine a third transmit power for transmitting the first part as part of a four-step RACH procedure based on the first function having possible different values for one or more of the parameters than for the two-step RACH procedure; and determine a fourth transmit power for transmitting the second part as part of the four-step RACH procedure based on the second function having possible different values for one or more of the parameters than for the two-step RACH procedure.

11. The user equipment of claim 10, wherein the processor is further configured to:

determine a fifth transmit power for transmitting the first part as part of a four-step fall back RACH procedure after falling back from the two-step RACH procedure based on the first function having possible different values for one or more of the parameters than for the two-step RACH procedure and the four-step RACH procedure; and determine a sixth transmit power for transmitting the second part as part of the four-step fall back RACH procedure based on the second function having possible different values for one or more of the parameters than for the two-step RACH procedure and the four-step RACH procedure.

12. The user equipment of claim 9, wherein the payload type is based on one or more of a quality of service, priority flow, or reason for connection request.

13. The user equipment of claim 9, wherein the processor is further configured to fall back to a four-step RACH procedure based on one or more of the first transmit power reaching a first maximum power or the second transmit power reaching a second maximum power.

14. The user equipment of claim 9, wherein the processor is further configured to fall back to a four-step RACH procedure, wherein the power ramping counter is maintained after the falling back.

15. The user equipment of claim 14, wherein the power ramping step has a first value for the two-step RACH procedure and a second value for the four-step RACH procedure.

16. The user equipment of claim 9, wherein the processor is further configured to:

increment a single transmit counter for each retransmission of the first message;

determine if the single transmit counter has reached a first threshold;

fall back to a four-step RACH procedure when the single transmit counter reaches the first threshold; and declare a RACH failure when the single transmit counter reaches a second threshold.

17. A user equipment comprising:

means for determining a transmit power for transmitting a first message to a base station (BS) as part of a two-step random access channel (RACH) procedure, the first message comprising a first part comprising a RACH preamble and a second part comprising a radio resource control (RRC) connection request, wherein determining the transmit power comprises:

determining a first transmit power for transmitting the first part based on a first function having parameters including a power ramping counter and a power ramping step; and determining a second transmit power for transmitting the second part based on a second function having parameters including the power ramping counter and the power ramping step, wherein one or more of the parameters of one or more of the first function or the second function are a function of a payload type for which the user equipment is performing RACH, and wherein the one or more of the parameters of the one or more of the first function or the second function change from a first transmission of the first message to a second transmission of the first message based on a change in payload of the first message from the first transmission to the second transmission;

means for transmitting the first message to the BS using the determined transmit power; and means for incrementing the power ramping counter based on transmitting the first message.

18. The user equipment of claim 17, further comprising:

means for determining a third transmit power for transmitting the first part as part of a four-step RACH procedure based on the first function having possible different values for one or more of the parameters than for the two-step RACH procedure; and means for determining a fourth transmit power for transmitting the second part as part of the four-step RACH procedure based on the second function having possible different values for one or more of the parameters than for the two-step RACH procedure.

19. The user equipment of claim 18, further comprising:

means for determining a fifth transmit power for transmitting the first part as part of a four-step fall back RACH procedure after falling back from the two-step RACH procedure based on the first function having possible different values for one or more of the parameters than for the two-step RACH procedure and the four-step RACH procedure; and means for determining a sixth transmit power for transmitting the second part as part of the four-step fall back RACH procedure based on the second function having possible different values for one or more of the parameters than for the two-step RACH procedure and the four-step RACH procedure.

20. The user equipment of claim 17, wherein the payload type is based on one or more of a quality of service, priority flow, or reason for connection request.

21. The user equipment of claim 17, further comprising means for falling back to a four-step RACH procedure based on one or more of the first transmit power reaching a first maximum power or the second transmit power reaching a second maximum power.

22. The user equipment of claim 17, further comprising means for falling back to a four-step RACH procedure, wherein the power ramping counter is maintained after the falling back.

23. The user equipment of claim 22, wherein the power ramping step has a first value for the two-step RACH procedure and a second value for the four-step RACH procedure.

24. The user equipment of claim 17, further comprising:

means for incrementing a single transmit counter for each retransmission of the first message;

means for determining if the single transmit counter has reached a first threshold;

means for falling back to a four-step RACH procedure when the single transmit counter reaches the first threshold; and means for declaring a RACH failure when the single transmit counter reaches a second threshold.

25. A non-transitory computer-readable medium that comprises instructions that when executed by a user equipment (UE), cause the UE to perform a method for wireless communication, the method comprising:
  determining a transmit power for transmitting a first message to a base station (BS) as part of a two-step random access channel (RACH) procedure, the first message comprising a first part comprising a RACH preamble and a second part comprising a radio resource control (RRC) connection request, wherein determining the transmit power comprises:
    determining a first transmit power for transmitting the first part based on a first function having parameters including a power ramping counter and a power ramping step; and
    determining a second transmit power for transmitting the second part based on a second function having parameters including the power ramping counter and the power ramping step, wherein one or more of the parameters of one or more of the first function or the second function are a function of a payload type for which the user equipment is performing RACH, and wherein the one or more of the parameters of the one or more of the first function or the second function change from a first transmission of the first message to a second transmission of the first message based on a change in payload of the first message from the first transmission to the second transmission;
  transmitting the first message to the BS using the determined transmit power; and
  incrementing the power ramping counter based on transmitting the first message.

26. The non-transitory computer-readable medium of claim 25, the method further comprising:
  determining a third transmit power for transmitting the first part as part of a four-step RACH procedure based on the first function having possible different values for one or more of the parameters than for the two-step RACH procedure; and
  determining a fourth transmit power for transmitting the second part as part of the four-step RACH procedure based on the second function having possible different values for one or more of the parameters than for the two-step RACH procedure.

27. The non-transitory computer-readable medium of claim 26, the method further comprising:
  determining a fifth transmit power for transmitting the first part as part of a four-step fall back RACH procedure after falling back from the two-step RACH procedure based on the first function having possible different values for one or more of the parameters than for the two-step RACH procedure and the four-step RACH procedure; and
  determining a sixth transmit power for transmitting the second part as part of the four-step fall back RACH procedure based on the second function having possible different values for one or more of the parameters than for the two-step RACH procedure and the four-step RACH procedure.

* * * * *